United States Patent
Farkas et al.

(10) Patent No.: US 9,077,626 B2
(45) Date of Patent: Jul. 7, 2015

(54) IN-SERVICE UPGRADE OF PROVIDER BRIDGE NETWORKS

(75) Inventors: János Farkas, Kecskemét (HU); Balázs Peter Gerö, Budapest (HU); Panagiotis Saltsidis, Stockholm (SE); Attila Takács, Budapest (HU)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 392 days.

(21) Appl. No.: 13/700,822

(22) PCT Filed: Jan. 24, 2011

(86) PCT No.: PCT/IB2011/050306
§ 371 (c)(1),
(2), (4) Date: Jan. 10, 2013

(87) PCT Pub. No.: WO2011/154850
PCT Pub. Date: Dec. 15, 2011

(65) Prior Publication Data
US 2013/0194973 A1    Aug. 1, 2013

Related U.S. Application Data

(60) Provisional application No. 61/353,065, filed on Jun. 9, 2010.

(51) Int. Cl.
*H04L 12/28* (2006.01)
*H04L 12/24* (2006.01)
(Continued)

(52) U.S. Cl.
CPC .......... *H04L 41/082* (2013.01); *H04L 12/4687* (2013.01); *H04L 12/4675* (2013.01); *H04L 12/4645* (2013.01); *G06F 8/67* (2013.01)

(58) Field of Classification Search
CPC .............. H04L 12/4641; H04L 49/354; H04L 29/06068; H04L 12/4645; H04L 12/4675; H04L 12/4687
USPC .............................. 370/395.53, 546, 401, 400
See application file for complete search history.

(56) References Cited

U.S. PATENT DOCUMENTS 7,697,534 B1 * 4/2010 Narayanan et al. ........... 370/392
8,059,549 B2 * 11/2011 Soon et al. .................... 370/242
(Continued)

FOREIGN PATENT DOCUMENTS

| EP | 1643720 A1 | 4/2006 |
| WO | 0184792 A1 | 4/2001 |
| WO | 2008117205 A2 | 10/2008 |

OTHER PUBLICATIONS

Sajassi, Ali et al. "Provider Backbone Bridges in H-VPLS with MPLS Access" draft-asjassi-12vpn-pbb-vpls-mpls-access-00.txt. Internet-Draft L2VPN Working Group; Internet Engineering Task Force; Standardworkingdraft, Jul. 1, 2008; pp. 1-18; Internet Society 4, Rue Des Falaises, CH01205 Geneva Switzerland.

(Continued)

*Primary Examiner* — Ricky Ngo
*Assistant Examiner* — Dewanda Samuel
(74) *Attorney, Agent, or Firm* — Coats & Bennett, PLLC

(57) ABSTRACT

A system and method for in-service migration for a Virtual Local Area Network, VLAN, service if a Provider Bridge Metro Ethernet Network, PB MEN, is upgraded to a Provider Backbone Bridge, PBB, MEN or an Internet Protocol/Multi Protocol Label Switching, IP/MPLS, MEN. After the deployment of the new PBB or IP/MPLS technology, a sequence of management actions are performed to configure PBB or IP/MPLS edge nodes to use the new technology as well as the old PB-based technology to support the VLAN service. Both old and new connectivity structures are maintained in the edge nodes during the entire migration process. Customer traffic is then redirected per edge node to the new technology. When each edge node entirely provides the VLAN service under the new technology, the migration is complete.

18 Claims, 11 Drawing Sheets

(51) Int. Cl.
*H04L 12/46* (2006.01)
*G06F 9/445* (2006.01)

(56) References Cited

U.S. PATENT DOCUMENTS

| | | | | |
|---|---|---|---|---|
| 8,385,341 | B2* | 2/2013 | Kern et al. | 370/390 |
| 2002/0073410 | A1 | 6/2002 | Lundback et al. | |
| 2005/0193385 | A1 | 9/2005 | De Heer et al. | |
| 2009/0274148 | A1* | 11/2009 | Tremblay et al. | 370/384 |
| 2010/0271980 | A1* | 10/2010 | Kini et al. | 370/256 |
| 2011/0016473 | A1* | 1/2011 | Srinivasan | 718/105 |
| 2011/0310904 | A1* | 12/2011 | Gero et al. | 370/401 |

OTHER PUBLICATIONS

Fang, Luyuan et al. "The Evolution of Carrier Ethernet Services—Requirements and Deployment Case Studies", IEEE Communications Magazine, XP-002588613; Mar. 1, 2008, pp. 69-76, IEEE Service Center, Piscataway, US; Retrieved from Internet: URL:http://www.sis.pitt.edu/-dtipper/2011/COE.pdf.

Salam S. et al. "Provider Backbone Bridging and MPLS: Complementary Technologiegs for Next Generation Carrier Ethernet Transport"; IEEE Communications Magazine, vol. 45, No. 3; pp. 77-83; Mar. 1, 2008; IEEE Service Center, Piscataway, US.

* cited by examiner

FIG. 5
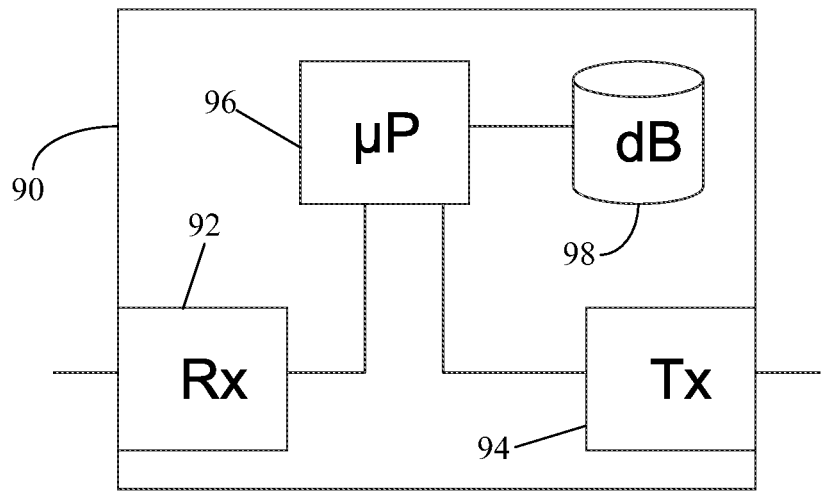
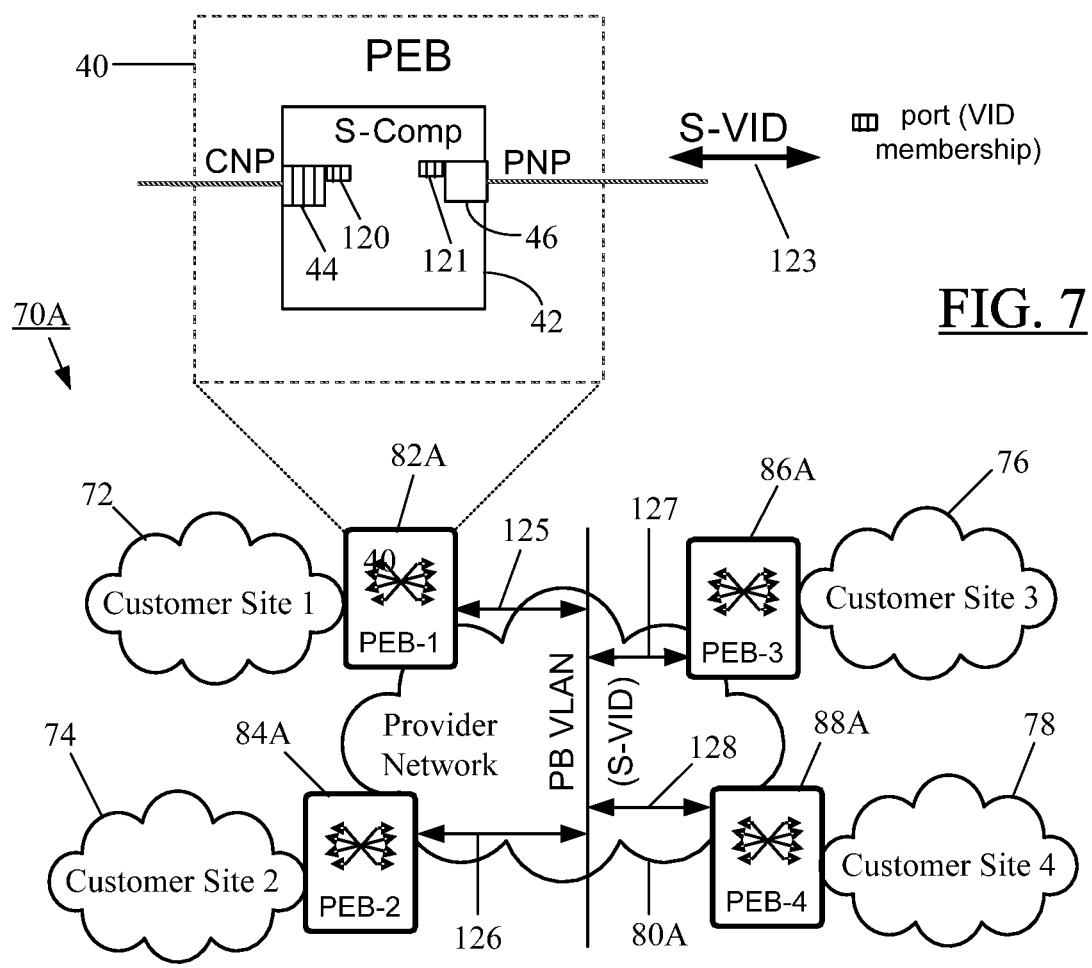
FIG. 7

IN-SERVICE UPGRADE OF PROVIDER BRIDGE NETWORKS

RELATED APPLICATIONS

This application claims the benefit of U.S. Provisional Application No. 61/353,065 filed Jun. 9, 2010.

TECHNICAL FIELD

The present invention relates generally to Ethernet networks, and more particularly, to a system and method for in-service upgrade of a Provider Bridge (PB) network without the need to migrate the Virtual Local Area Network (VLAN) service from the old technology to the new technology exactly at the same time in all edge nodes of the upgraded network.

BACKGROUND

Many systems and architectures have been disclosed for handling data traffic over distributed networks. Today's Metro Ethernet Networks (MEN) are implemented utilizing IEEE 802.1ad Provider Bridges (PBs). Each PB provides separation for the customer Virtual Local Area Network (VLAN) space and the provider VLAN space by distinguishing a Customer VLAN (C-VLAN) and a Service VLAN (S-VLAN). Provider Edge Bridges (PEBs) in the PB-based VLAN add an S-VLAN tag into the header of customer frames entering the provider network. PB Networks achieve provider/customer service separation since the S-VLAN is used for service identification and forwarding, but customer addresses are still visible in the provider network. MEN operators may upgrade their networks in order to avoid these limitations of PBs.

The natural evolution and upgrade of a PB network is the deployment of IEEE 802.1ah Provider Backbone Bridges (PBBs). PBB is a set of architecture and protocols for routing of customer traffic of a customer network over a provider's network allowing interconnection of multiple PB networks without losing each customer's individually defined VLANs. Thus, PBB provides a cost-efficient way to address customer number scalability issues, as it allows edge port upgrades for services associated with large numbers of customers. Thus, a PB-based PEB can be upgraded to a PBB-based Backbone Edge Bridge (BEB) to provide service scalability. BEBs implement a full encapsulation on customer frames by adding a new header that includes the backbone destination address, the backbone source address, the Backbone VLAN (B-VLAN), and a Service Instance Tag (I-tag) that contains a Backbone Service Instance Identifier (I-SID) used as a service identifier. Thus, by means of MAC-in-MAC (Media Access Control) encapsulation, the PBB separates customer and provider MAC address space and resolves the service scalability limitations through the introduction of the I-SID. It is noted here that core bridges of a PB Network (PBN) remain untouched, as no upgrade is needed for PBB transport.

Alternatively, a PB MEN may be upgraded such that Internet Protocol/Multiprotocol Label Switching (IP/MPLS) is deployed and the PEBs are replaced with IP/MPLS Provider Edge (PE) routers. The transport between the PE routers utilizes the existing PB network, at least in the first phase of the migration to the new technology. The IP/MPLS PE routers provide Layer 2 (i.e., the Ethernet layer) service by using Virtual Private LAN Service (VPLS) or Virtual Private Wire Service (VPWS). The upgrade of PB-based edge bridges in this case may mean deployment of new edge nodes that implement IP/MPLS.

Edge bridges of the PB network may implement a hot upgrade capability for the introduction of new features under PBB or IP/MPLS. After the deployment of new features, PB-based VLANs are migrated to the new technology. Nevertheless, a VLAN service is typically provided by multiple edge nodes—by two edge nodes in case of a point-to-point VLAN and by more edge nodes in case of a multipoint VLAN service. Currently, in order to provide in-service migration of a PB-based VLAN, the VLAN service should be moved from the old technology to the new technology exactly at the same time in all edge nodes supporting the VLAN service. This existing solution is very difficult to implement without additional cost, because it requires coordination and strict timing between the management actions being run on all edge nodes individually. In addition, the existing method is prone to eventual configuration errors. If the configuration operation is unsuccessful in one or more edge nodes, the service is disrupted and it may be difficult to roll back to the original VLAN service configuration to prevent such service disruption.

SUMMARY

The present invention provides a system and method for in-service migration for a VLAN service being upgraded. After the deployment of the new technology (PBB or IP/MPLS), a sequence of management actions are performed in order to configure PBB or IP/MPLS edge nodes to use the new technology to support the VLAN service while also still using the old technology (PB-based) to support the VLAN service. Both connectivity structures (i.e., connectivity structures for the old as well as the new technologies) are maintained in the edge nodes during the entire migration process. Customer traffic is then smoothly redirected to the new technology individually on each edge node—on an edge node by edge node basis. As soon as each edge node entirely provides the VLAN service under the new technology, the migration is complete.

In one embodiment, the present invention is directed to a method of upgrading a PB based VLAN providing a VLAN service under a first technology into an upgraded VLAN providing the VLAN service under a second technology. The method comprises the steps of: performing in-service upgrading of each PEB supporting the VLAN service under the first technology in the PB-based VLAN into a corresponding upgraded edge node supporting the VLAN service under the second technology in the upgraded VLAN; using a processor, configuring each upgraded edge node to simultaneously support the VLAN service under both of the first and the second technologies until all customer traffic is migrated to the second technology; and, using the processor, providing sequential in-service migration of the customer traffic to the second technology on an edge node by edge node basis.

In another embodiment, the present invention is directed to a network controller in communication with a plurality of edge nodes supporting a VLAN service under a first technology, wherein each of the plurality of edge nodes is upgraded into a corresponding upgraded edge node supporting the VLAN service under a second technology. The network controller comprises a processor; and a memory containing a program code. The program code, when executed by the processor, causes the processor to configure each upgraded edge node to simultaneously support the VLAN service under both of the first and the second technologies until all customer traffic is migrated to the second technology. The program code, upon execution by the processor in the network controller, further causes the processor to provide sequential in-service migration of the customer traffic to the second technology on an edge node by edge node basis.

In another embodiment, the present invention is directed to a method of providing an in-service migration of a network service under a first technology into the network service under a second technology. The method comprises: performing in-service upgrading of each edge node supporting the network service under the first technology into a corresponding upgraded edge node supporting the network service under the second technology; using a processor, configuring each upgraded edge node to simultaneously support the network service under both of the first and the second technologies until all customer traffic is migrated to the second technology; and, using the processor, providing sequential in-service migration of the customer traffic to the second technology on an edge node by edge node basis.

In another embodiment, the present invention is directed to a BEB in a PBB VLAN. The BEB comprises: a CNP (Customer Network Port) providing interface of the BEB in a customer space; a first PNP (Provider Network Port) providing a PB based interface of the BEB in a provider network space; and a second PNP providing a PBB based interface of the BEB in the provider network space, wherein the second PNP integrates functionalities of a PIP (Provider Instance Port) of an I-Component (Customer Instance Component) of the BEB and a CBP (Customer Backbone Port) of a B-Component of the BEB.

In a further embodiment, the present invention is directed to a BEB in a PBB VLAN. The BEB comprises: an external CNP providing interface of the BEB in a customer space; an external PNP providing a PBB-based interface and a PB based interface of the BEB in a provider network space; and an internally-linked pair of PIP and CBP ports to support PBB functionality at the BEB.

The present invention thus provides a method for in-service migration of an entire VLAN if a PB MEN is upgraded to a PBB or IP/MPLS based MEN. The invention minimizes traffic outage in the upgraded VLAN service by avoiding timing problems when switching traffic from the old technology to the new technology. The migration may be hitless depending on the hot upgrade capabilities of edge nodes and whether PBB or IP/MPLS is being introduced.

Furthermore, the migration sequence described in embodiments of the present invention enables providers to check the outcome of individual configuration steps before implementing the next configuration step. This decreases the outage caused by an accidental erroneous configuration and supports easy roll back capability.

BRIEF DESCRIPTION OF THE DRAWINGS

FIG. 5 shows a block diagram of exemplary architectural details of the Network Management System illustrated in FIG. 4;

FIGS. 7-11 illustrate implementations of various steps depicted in the flowchart in FIG. 6 in the context of an example network and the configuration of VIDs in each bridge in the network;

DETAILED DESCRIPTION

Figure 1:
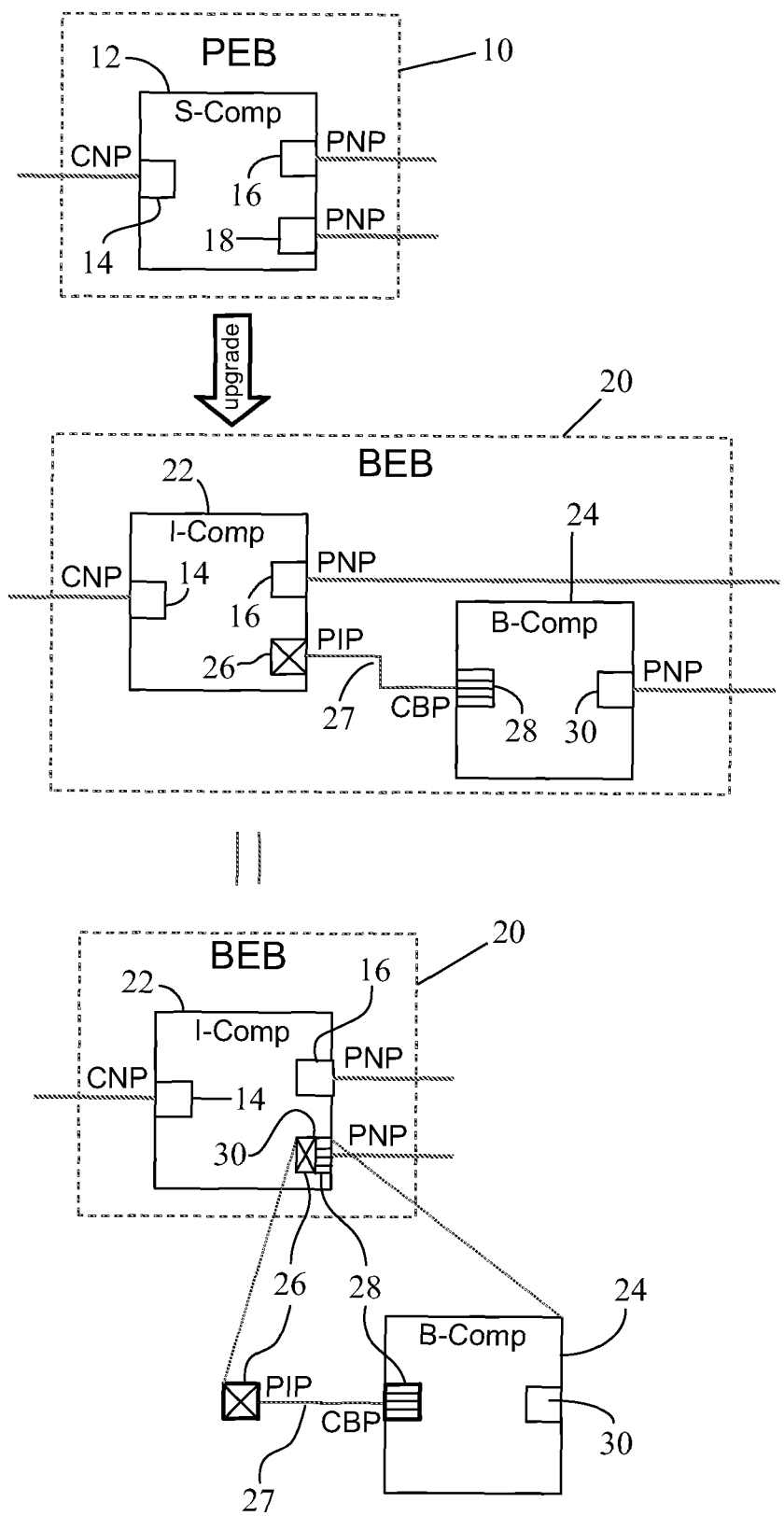
FIG. 1 illustrates a process of upgrading a port of a PEB according to one embodiment of the present invention.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

It is noted at the outset that the terms "coupled," "connected", "connecting," "electrically connected," etc., are used interchangeably herein to generally refer to the condition of being electrically connected. Similarly, a first entity is considered to be in "communication" with a second entity (or entities) when the first entity electrically sends and/or receives (whether through wireline or wireless means) information signals (whether containing voice information or non-voice data information) to the second entity regardless of the type (analog or digital) of those signals. It is further noted that various figures (including component diagrams) shown and discussed herein are for illustrative purpose only, and are not drawn to scale.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) in various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form.

In the present invention, prior to migration of the PB-based VLAN service to the new technology (PBB or IP/MPLS), each edge node in the PB-based VLAN is upgraded first. (This upgrading aspect is discussed below with reference to FIGS. 1-3.) The VLAN service migration is then carried out sequentially on an edge node by edge node basis in each upgraded edge node until all customer traffic is migrated to the new technology. (This migration aspect is discussed in more detail below with reference to FIGS. 4-13).

As mentioned above, introduction of a new technology in a PB MEN may begin by upgrading each edge node (i.e., PEB). The upgrade required on an edge bridge (i.e., a PEB) mainly depends on which technology is being introduced, PBB or IP/MPLS. Furthermore, the upgrade also depends on the implementation, i.e., the internal edge node architecture. However, independent of these technological differences, it is preferable that each edge node (PEB) has a hot upgrade capability (i.e., capability to be upgraded while in-service, and without being placed off-line or disrupting the service) in order to be able to provide in-service migration of a VLAN service.

FIG. 1 illustrates a process of upgrading a port of a PEB 10 according to one embodiment of the present invention. In the embodiment of FIG. 1, an S-Component (Service Component) 12 of the PEB 10 is shown to include three ports—one Customer Network Port (CNP) 14 and two Provider Network Ports (PNPs) 16, 18. The CNP 14 may be a bi-directional port connecting the PEB 10 to a customer site (e.g., customer site 72 in FIG. 4). The CNP 14 may receive customer traffic from the customer site and send the customer traffic received from a VLAN service provider network (e.g., the provider network 80 in FIG. 4) to the corresponding customer site. The bridge ports 16, 18 also may be bi-directional ports linking the PEB 10 to the provider network (and, hence, establishing electrical communication between the respective customer site and the service provider network). The PNP's 16, 18 may transmit customer traffic received from the CNP 14 into the provider network and forward the customer traffic received from the provider network to the CNP 14 for onward delivery to the customer site.

In case of the introduction of PBB (i.e., upgrade of a PB-based VLAN to a PBB-based VLAN), it may be enough to upgrade a provider-side bridge port (e.g., the PNP port 18) of the PEB 10 to implement BEB functionalities. As illustrated in FIG. 1, the PEB 10 may be upgraded to a BEB 20 by implementing the BEB components—i.e., an I-Component (which is an S-VLAN component with one or more Provider Instance Ports (PIPs)) 22 and a B-Component (which is an S-VLAN component with one or more Customer Backbone Ports (CBPs)) 24—by the edge bridge (i.e., the PEB 10). Although not shown in FIG. 1, it is noted here that both the I and the B components may comprise external ports, a switching relay, etc. The I-Component 22 and the B-Component 24 may be essentially the S-Component 12 implementing the new (BEB-related) features. These BEB components 22, 24 may be implemented in the PEB 10 to upgrade the PEB 10 to the BEB 20.

As illustrated in FIG. 1, a new component—i.e., the B-Component 24—may be implemented in the PEB 10 and a port of the S-Component (here, PNP 18) may be upgraded to implement BEB functionalities. Thus, PNP 18 may be upgraded to implement a Provider Instance Port (PIP) 26 (shown by a square with an "X") of the I-Component 22, whereas the new B-Component 24 may provide a Customer Backbone Port (CBP) 28 (shown by a square with horizontal lines) and a PNP 30. In the BEB 20, the I and the B components may be linked by a connection 27 between the PIP 26 and the CBP 28 as shown in FIG. 1. It is observed here that the B-Component 24 may implement a simple tagging function on the customer traffic with a B-VID (Backbone VLAN Identifier) if it has a single CBP and a single PNP. Therefore, this tagging functionality can be integrated into the new PNP 30, which may integrate the functionalities of the PIP 26 and the CBP 28 as shown at the bottom of FIG. 1. The resulting BEB 20 may thus include the CNP 14 and the old PNP 16 from the PEB 10 to accommodate PB functionality, whereas the new PNP 30 (which is the upgraded version of the PNP 18 in the PEB 10) is introduced to support PBB functionality.

Figure 2:
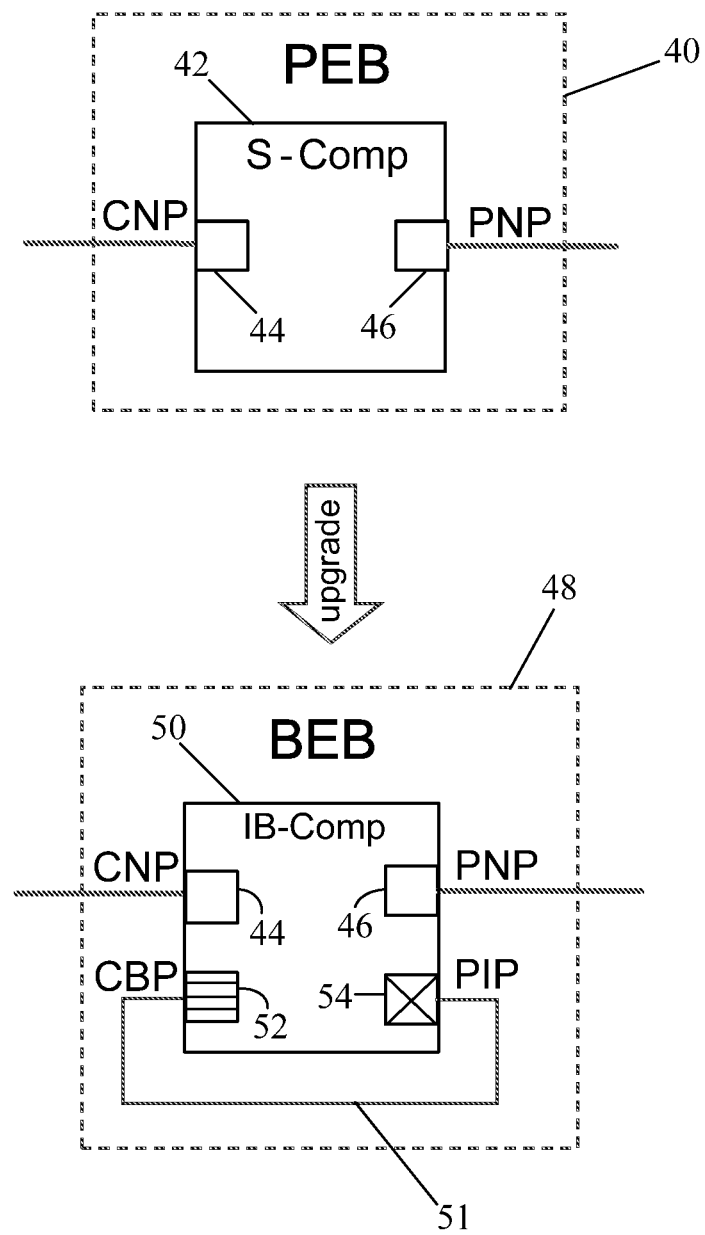
FIG. 2 shows another process of upgrading a PEB to a BEB according to one embodiment of the present invention.

However, in one embodiment, it may be desirable to have a PEB with a single PNP. In that case, instead of adding a new PNP (e.g., the PNP 30 in FIG. 1), the PEB may be upgraded to a BEB as illustrated in FIG. 2, which shows another process of upgrading a PEB 40 to a BEB 48 according to one embodiment of the present invention. The PEB 40 is shown to include an S-Component 42 with a CNP 44 and a single PNP 46 (as opposed to two PNPs in the S-Component 12 of FIG. 1). The PEB 40 may be upgraded to the BEB 48 having an IB-Component 50 implementing the functionalities of the individual I and B components (not shown) of the BEB 48. These I and B components may be similar to the I and B components 22, 24 in FIG. 1 and, hence, additional details thereof are not shown in FIG. 2. The internal interconnection 51 between a CBP 52 (shown by a square with horizontal lines) and a PIP 54 (shown by a square with an "X") linking the I and the B components of the BEB 48 may be utilized in the BEB 48 such that the old S-Component 42 (of PEB 40) is upgraded to implement PIP and CBP (of the BEB 48) to support PBB functionality, but without modifying either the old CNP 44 or the old PNP 46 (which support PB functionality). In other words, like the PEB 40, the BEB 48 also provides only two external ports—the CNP 44 and the PNP 46—but the BEB 48 is also capable of supporting PBB functionality because of implementation of internal PIP 54 and CBP 52 ports.

It is noted here that the upgrading methods illustrated in FIGS. 1 and 2 are exemplary in nature. Various alternative methods may be used to introduce BEB features in a PB-based edge bridge (PEB) to upgrade the PEB to a PBB-based BEB as desired. Furthermore, whether the I and the B components of the resulting BEB are wholly or partly implemented in hardware or software, the PIP and the CBP of the BEB may be implemented as software elements (in which case, the PIP and the CBP may function as virtual ports, as opposed to physical hardware ports). It is also noted here that additional S-Components, ports, or other architectural details of a PEB or additional structural details of a BEB (e.g., additional I-Components, memory, processor(s), management interface, etc.) are not shown in FIGS. 1-2 (and also in other figures discussed below) for the sake of clarity and ease of illustration.

In some cases, instead of upgrading a PEB as shown in FIG. 1 or 2, a PB MEN network operator may decide to replace one or more PEBs by deploying new nodes (with BEB functionality), e.g. from a different vendor. In contrast to the upgraded nodes according to FIGS. 1 and 2, these new nodes may not offer PB-based support. If a new node is thus deployed, then the customer traffic migration according to the teachings of the present invention may begin with the movement of the old (PB-based) connectivity structure to the new node and redirection of customer traffic to the new node as illustrated for IP/MPLS PEs in FIG. 3 discussed below.

Figure 3:
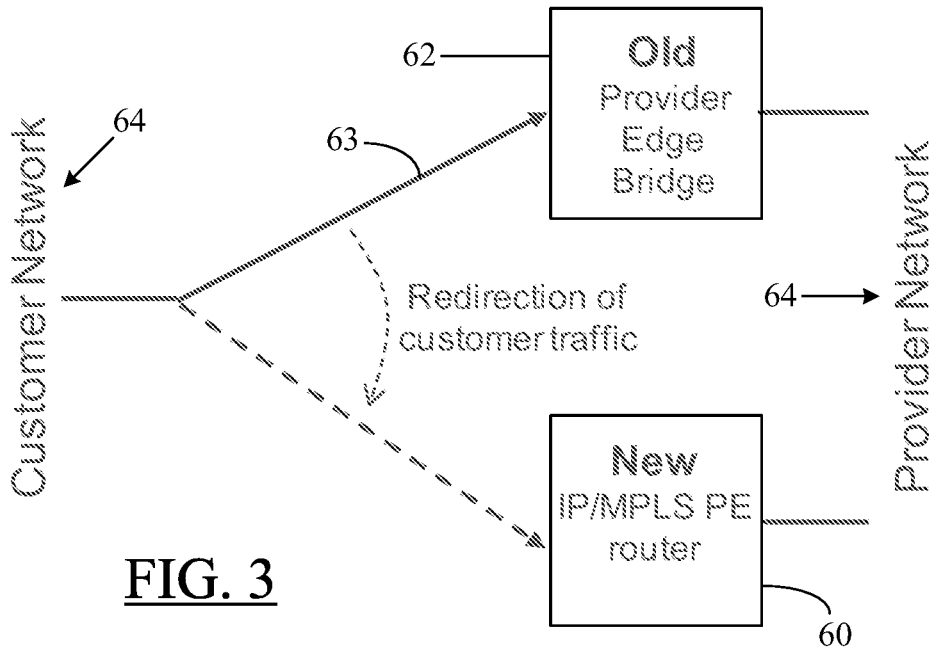
FIG. 3 is a simplified block diagram illustrating the deployment of a new IP/MPLS PE router.

FIG. 3 is a simplified block diagram illustrating the deployment of a new IP/MPLS PE router 60, which may be required to introduce IP/MPLS to upgrade a PB-based VLAN. The exact upgrade of an old PEB 62 may depend on the implementation. The upgrade may be, for example, the insertion of a new line card (in the old PEB 62) to implement IP/MPLS or the deployment of a new edge node (e.g., the IP/MPLS PE router 60) that implements IP/MPLS and PB as well. If a new node (or a new entity) implements IP/MPLS and PB functionalities as well, then the first step of migration may be to set up the old service structures on the new node 60. At some point of the migration, the customer traffic 63 between a customer network 64 and a provider network 64 (linked by the edge nodes 60, 62) is then redirected from the old PEB 62 to the new IP/MPLS PE router 60 as shown in FIG. 3 such that the old (PB-based) connectivity structure is used on the new node 60 until all customer traffic is migrated to the new technology (i.e., IP/MPLS) at all relevant edge nodes in the provider network 64. The old PEB 62 may be taken off service once all customer traffic is migrated to its associated IP/MPLS PE router 60.

It is noted here that the upgrading discussed hereinbefore with reference to FIGS. 1-3 may be performed automatically (e.g., remotely using a control terminal), semi-automatically (e.g., with some manual input), or fully manually, depending on the architecture of the old PB-based implementation and the desired (new) upgrade capabilities.

Figure 4:
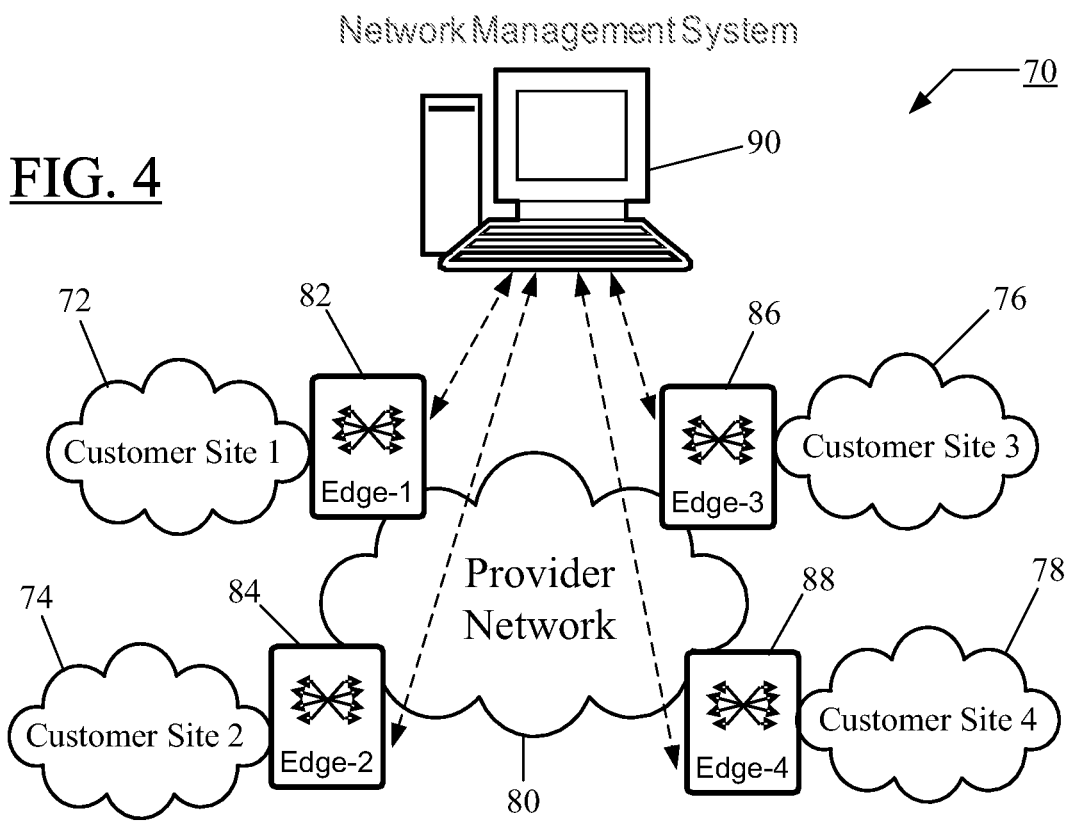
FIG. 4 illustrates schematic details of a system implementing in-service migration of a PB VLAN service using a remote Network Management System according to one embodiment of the present invention.

As mentioned before, the in-service migration of customer traffic from old PB-based VLAN to the new VLAN (PBB-based or IP/MPLS-based) according to the teachings of the present invention may be performed after all PEBs are hot-upgraded in one of the manners depicted in FIGS. 1-3. The migration method according to one embodiment may comprise a sequence of management actions that may be carried out remotely. FIG. 4 illustrates schematic details of a system 70 implementing in-service migration of a PB VLAN service using a remote Network Management System 90 according to one embodiment of the present invention. The in-service (or "hot") migration allows for migration of customer traffic without any disruption or interruption in the VLAN service or without placing any portion of the network off-line during migration. In FIG. 4, four exemplary customer sites 72, 74, 76, 78 are shown to be linked to a VLAN provider network 80 (which may support PB-based VLAN and its upgrade—i.e., the PBB-based VLAN or IP/MPLS-based VLAN) via respective Ethernet edge nodes 82, 84, 86, and 88. Initially, the edge nodes 82, 84, 86, 88 may be PB-based PEBs, but after their upgrade (as explained with reference to FIGS. 1-3), they may be PBB-based BEBs or IP/MPLS PE routers as per desired implementation. The customer sites, edge nodes, and provider network in FIG. 4 may be part of a MEN (whether PB-based, PBB-based, or IP/MPLS-based).

The Network Management System ("NMS") 90 may be interchangeably referred to below as a "network controller." As illustrated in FIG. 4, the NMS 90 may be able to remotely communicate with the edge nodes 82, 84, 86, 88 and thus be able to perform required migration management steps illustrated in FIGS. 6, 12, and 13 (discussed later). In one embodiment, the network controller 90 may be part of the provider network 80 and may be managed by an entity operating the provider network 80. In another embodiment, the network controller 90 may be independently-operated by a third party. The network controller 90 may be electrically connected to the edge nodes 82, 84, 86, 86 via a wireline network (not shown), a wireless network (not shown), or a suitable combination of both.

FIG. 5 shows a block diagram of exemplary architectural details of the Network Management System 90 illustrated in FIG. 4. In one embodiment, the NMS 90 may include a receive port (Rx) 92 and a transmit port (Tx) 94 to communicate management messages with the edge nodes 82, 84, 86, 88 in the system 70 in order to carry out in-service migration of the PB VLAN service as discussed below. The NMS 90 may also include a processor 96 and a memory 98. The memory may store the program code for the steps of the relevant migration method (e.g., the methods shown in FIG. 6 or 12), and the processor 96 may invoke/execute that program code to implement the desired migration. Thus, the network controller 90 may be configured (in hardware, via software, or both) to carry out the migration functionalities referred to in the flow charts in FIG. 6 or 12. The execution of the program code (by the processor 96 in the network controller 90) may cause the processor 96 to perform a relevant function or process step in FIG. 6 or 12 to implement the desired task.

Thus, in the discussion below, although the network controller 90 may be referred to as "performing," "accomplishing," or "carrying out" a function or process, it is evident to one skilled in the art that such performance may be technically accomplished in hardware and/or software as desired. The network controller 90 may be configured (in hardware and/or software) to perform all the customer traffic migration-related functions depicted in the specific exemplary embodiments of FIGS. 6 and 12 (and in the general embodiment of FIG. 13).

The processor 96 may include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

The memory 98 may include a computer-readable data storage medium. Examples of such computer-readable storage media include a Read Only Memory (ROM), a Random Access Memory (RAM), a digital register, a cache memory, semiconductor memory devices, magnetic media such as internal hard disks, magnetic tapes and removable disks, magneto-optical media, and optical media such as CD-ROM disks and Digital Versatile Disks (DVDs). Thus, the methods or flow charts provided herein may be implemented in a computer program, software, or firmware incorporated in a computer-readable storage medium (not shown) for execution by a general purpose computer or a processor (e.g., the processor 96 in FIG. 5).

Figure 6:
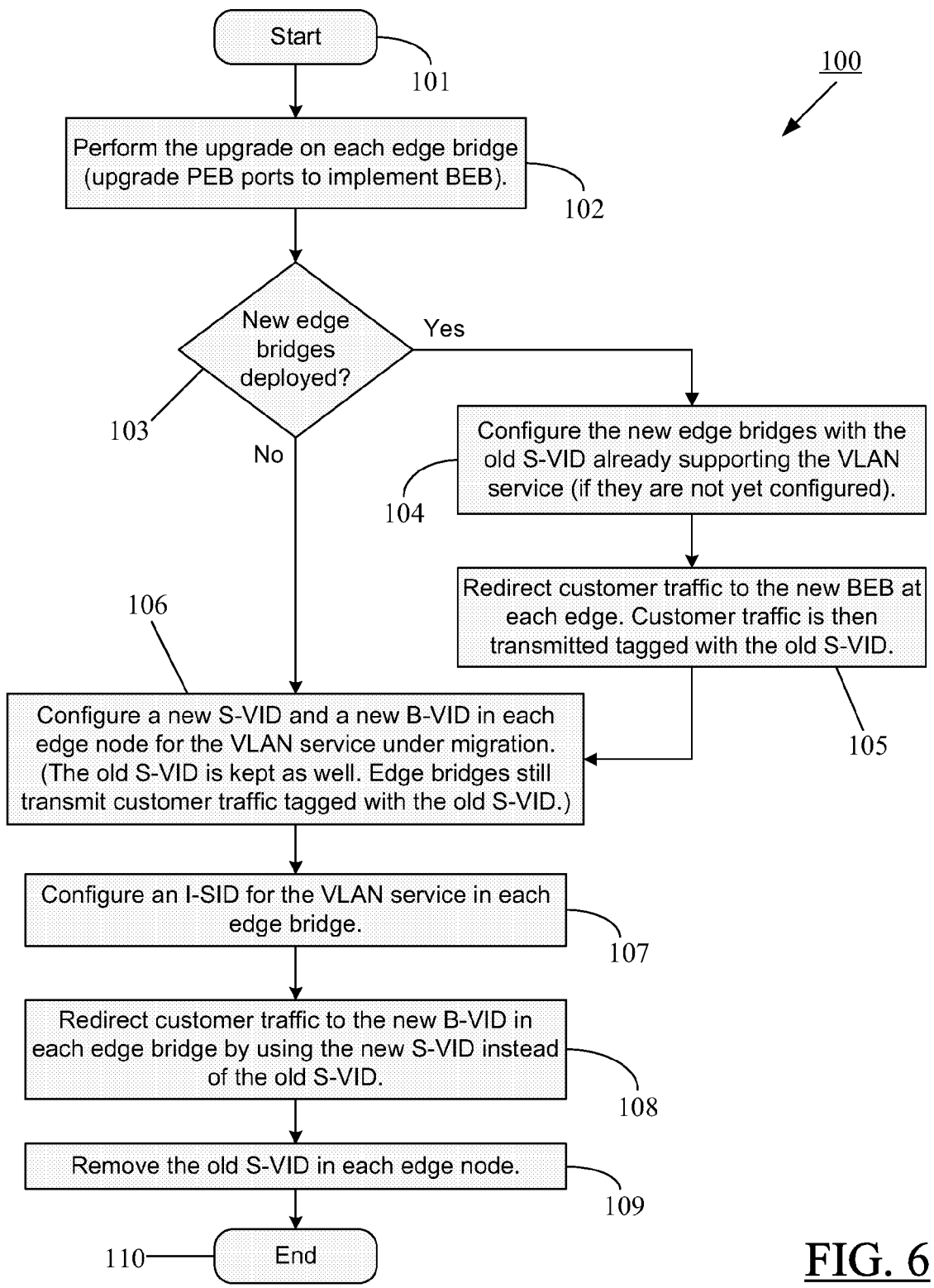
FIG. 6 is an exemplary flowchart depicting steps to implement customer traffic migration from a PB-based VLAN to a PBB-based VLAN according to one embodiment of the present invention.

FIG. 6 is an exemplary flowchart 100 depicting steps to implement customer traffic migration from a PB-based VLAN to a PBB-based VLAN according to one embodiment of the present invention. It is noted at the outset that the migration method according to the teachings of the present invention is essentially the same both for the introduction of PBB and the deployment of IP/MPLS. The main differences in the migration method between the two technologies may be due to the differences in the upgrade of the edge nodes. However, in order to provide an unambiguous description of the migration method, it is depicted in FIG. 6 for the introduction of PBB and in FIG. 12 for IP/MPLS deployment. Finally, FIG. 13 gives a single flow-chart illustrating the general migration steps applicable to both the implementations—PBB and IP/MPLS.

It is observed here that the migration method in FIG. 6 for the upgrade from PB to PBB may be simpler (than that for the upgrade from PB to IP/MPLS) because the node upgrade for PBB is somewhat less complex if no new edge bridge is deployed. In case of the introduction of PBB, it may be enough to upgrade a port of PEBs (using the methodology depicted in either of FIG. 1 or 2) and there may be no need to deploy new PBB-based edge nodes. However, for the sake of completeness, the migration method in FIG. 6 covers the case of the deployment of new edge bridges as well. In the discussion below, the flowchart 100 in FIG. 6 will be explained in conjunction with FIGS. 7-11, which illustrate implementations of various steps depicted in the flowchart 100 in FIG. 6 in the context of an example network (e.g., the provider network 80 shown in FIG. 4) and the configuration of VIDs (VLAN Identifiers) in each bridge in the network.

The initial state of the PB network is depicted in FIG. 7 where four sites 72, 74, 76, 78 of a single customer are shown connected to four corresponding PEBs 82A, 84A, 86A, 88A of the provider network 80A, which supports the PB-based VLAN service with an S-VID (Service VLAN Identifier) associated with the customer space. Thus, FIG. 7 shows the state of a PB network 70A prior to any node upgrades and prior to commencement of any customer traffic migration according to the teachings of the present invention. As shown in FIG. 7, each PEB 82A, 84A, 86A, 88A may have the single PNP-based configuration of the PEB 40 illustrated in FIG. 2. For ease of illustration, only one such PEB 40 is shown with reference to PEB 82A. As mentioned earlier, any other PEB configuration may be equally selected for the edge nodes in the PB-based provider network 80.

In FIG. 7, the ports 44, and 46 of the PEB 40 (i.e., each of the PEBs 82A, 84A, 86A, 88A) that are in the member set of the PB-based VLAN are shown by rectangles 120 and 121 with vertical linings. It is observed here that throughout the drawings herein, a port itself is illustrated by a square. The vertical lines (FIGS. 7-8), horizontal lines (FIGS. 9-11), or an "X" mark (FIGS. 9-11) are used for illustrative purpose to indicate whether the corresponding port is in the member set of a particular VLAN. Thus, for example, in FIG. 7, the small rectangles (120 and 121) with vertical lines next to their corresponding ports (44 and 46) indicate that the ports are in the member set of that VLAN. To elaborate further, in FIG. 7, ports 44 and 46 are in the member set of the VLAN service depicted by vertical lines; in FIG. 9, ports 52 and 46 are in the member set of the VLAN service depicted by horizontal lines, and port 46 is also in the member set of the VLAN service depicted by vertical lines; in FIG. 10, ports 54 and 44 are in the member set of the VLAN service depicted by an "X" inside the square of the port, and port 44 is also in the member set of the VLAN service depicted by vertical lines; and so on. In addition, in FIG. 7, the vertical lines of CNP 44 indicate the single Port VID (PVID) of the port, which is used for tagging untagged frames received from outside of the bridge. Similar reasoning applies to vertical-lined, horizontal-lined, or "X"-marked depictions of various ports in FIGS. 8-11. Thus, in the example of FIG. 7, customer frames received at the CNP 44 are tagged with its PVID and also with the S-VID of the VLAN service depicted by vertical lines. As shown in FIG. 7, these ports may facilitate bi-directional customer traffic on S-VID as indicated by the bi-directional arrow 123. Each PEB's bi-directional communication with the network fabric (using PB VLAN's S-VID) is also illustrated by bi-directional arrows 125-128.

Because the network configuration 70A in FIG. 7 (and also the network configurations 70B through 70E in FIGS. 8 through 11, respectively) is the same as the system 70 in FIG. 4, the same reference numerals are used to identify the customer sites. However, to more clearly illustrate PEB upgrading and customer traffic migration, the provider network and edge nodes in FIG. 7 (and also in FIGS. 8-11) are denoted with alphabetical extensions (e.g., 80A, 82A, 86B, etc.) to corresponding reference numerals for these entities in FIG. 4. However, it is understood that the network configurations in FIGS. 7 through 11 are all essentially depictions of the system 70 in FIG. 4 at various stages of the migration process discussed with reference to FIG. 6. Furthermore, although the network controller 90 in FIG. 4 is not illustrated in each of the FIGS. 7-11 for the sake of clarity, it is understood that the network controller 90 remains a part of the configurations in FIGS. 7-11 to accomplish various migration steps discussed herein with reference to FIG. 6.

Figure 8:
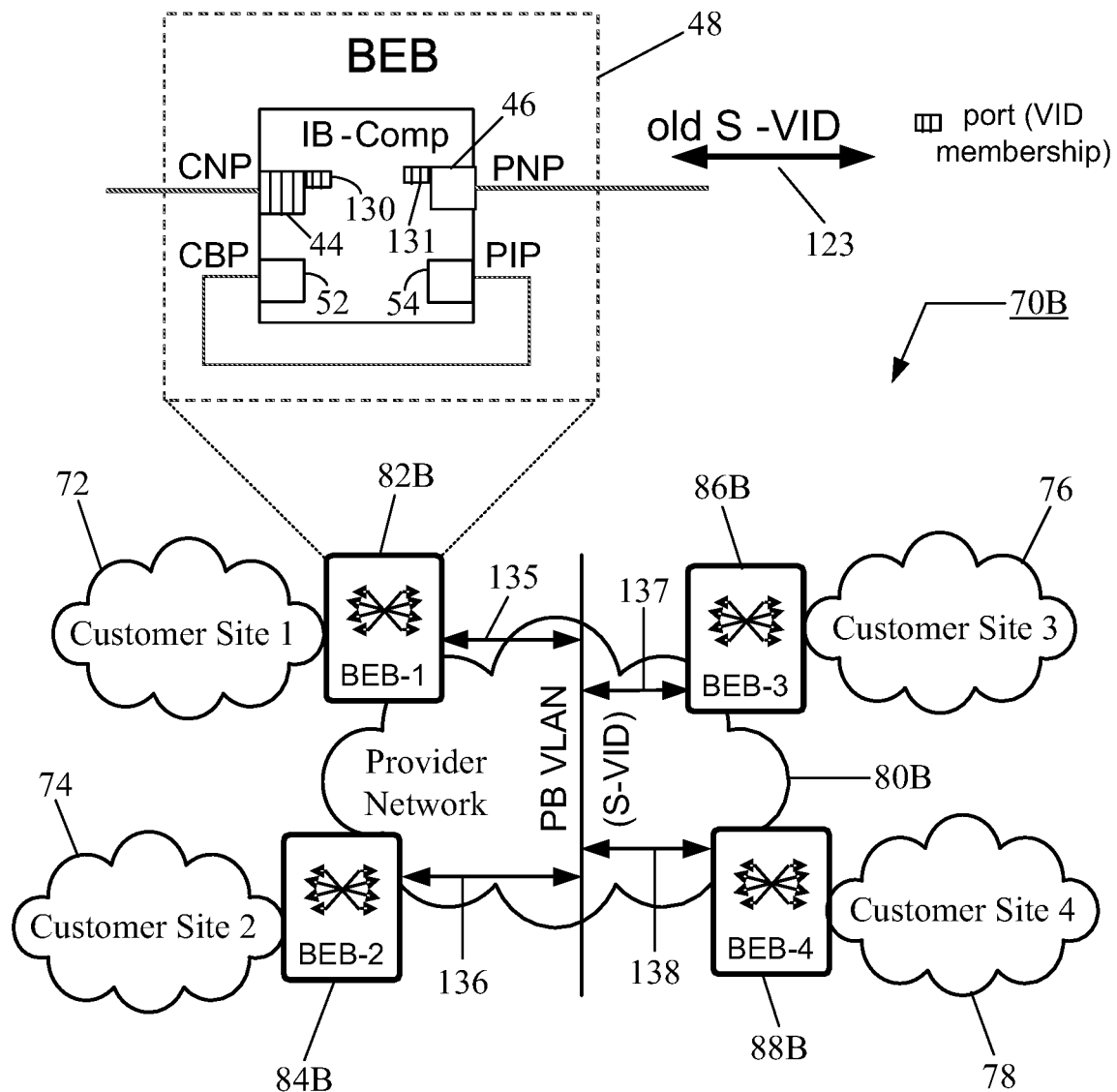

The process in FIG. 6 starts at block 101. As illustrated at block 102 in FIG. 6 and as mentioned before, the first step before migration is to perform the upgrade on each PB-based edge node. The PEBs in the PB VLAN may be upgraded as shown in FIG. 1 or 2. FIG. 8 illustrates a network configuration 70B in which the edge nodes (PEBs 82A, 84A, 86A, 88A) in FIG. 7 are upgraded to PBB-based BEBs 82B, 84A, 86B, and 88B. In the embodiment of FIG. 8, each PB-based PEB 82A, 84A, 86A, 88A in FIG. 7 is upgraded to the single PNP-based BEB 48 shown in FIG. 2. Thus, each BEB 82B, 84B, 86B, 88B in FIG. 8 may have the single PNP-based configuration of the BEB 48 illustrated in FIG. 2. For ease of illustration, only one such BEB 48 is shown in FIG. 8 with reference to BEB 82B. As mentioned earlier, any other BEB configuration may be equally selected for the edge nodes in the provider network 80B. In FIG. 8, the ports 44 and 46 of the BEB 48 (i.e., each of the BEBs 82B, 84B, 86B, and 88B) that are in the member set of the PB-based S-VID (now referred to herein as "old S-VID") are shown by rectangles 130, 131 with vertical linings. As shown in FIG. 8, these ports may facilitate bi-directional customer traffic on old S-VID as indicated by the bi-directional arrow 123. Each BEB's bi-directional communication with the network fabric (using PB VLAN's S-VID) is also illustrated by bi-directional arrows 135-138. Thus, although the PEBs in FIG. 7 are now upgraded to BEBs in FIG. 8 (and, hence, capable of supporting PBB-based customer traffic) and although the network 80B may now support PBB VLAN, the network controller 90 may configure the BEBs 82B, 84B, 86B, and 88B such that the customer traffic is still maintained on old S-VID associated with the PB-based VLAN 80A of FIG. 7.

In one embodiment, the upgrading (block 102, FIG. 6) may be carried out by deploying new edge bridges (not shown). If new edge bridges are deployed for some reason (block 103, FIG. 6), then blocks 104 and 105 in FIG. 6 may be relevant. As shown at block 104, if new edge bridges are deployed for BEB functionality instead of upgrading the existing PEBs as per FIG. 1 or 2 (block 102), then the network controller 90 may establish the old connectivity on the new bridge (i.e., each new edge bridge may be configured with the old S-VID already supporting the PB-based VLAN service in FIG. 7, if the new bridge is not so configured already). Thereafter, the network controller 90 may redirect customer traffic from the old node (i.e., PB-based PEB) to the new bridge (i.e., PBB-based BEB) as indicated at block 105 in FIG. 6. At this stage, the new BEB may still transmit the customer traffic tagged with the old (PB-based) S-VID shown in FIG. 7.

Figure 9:
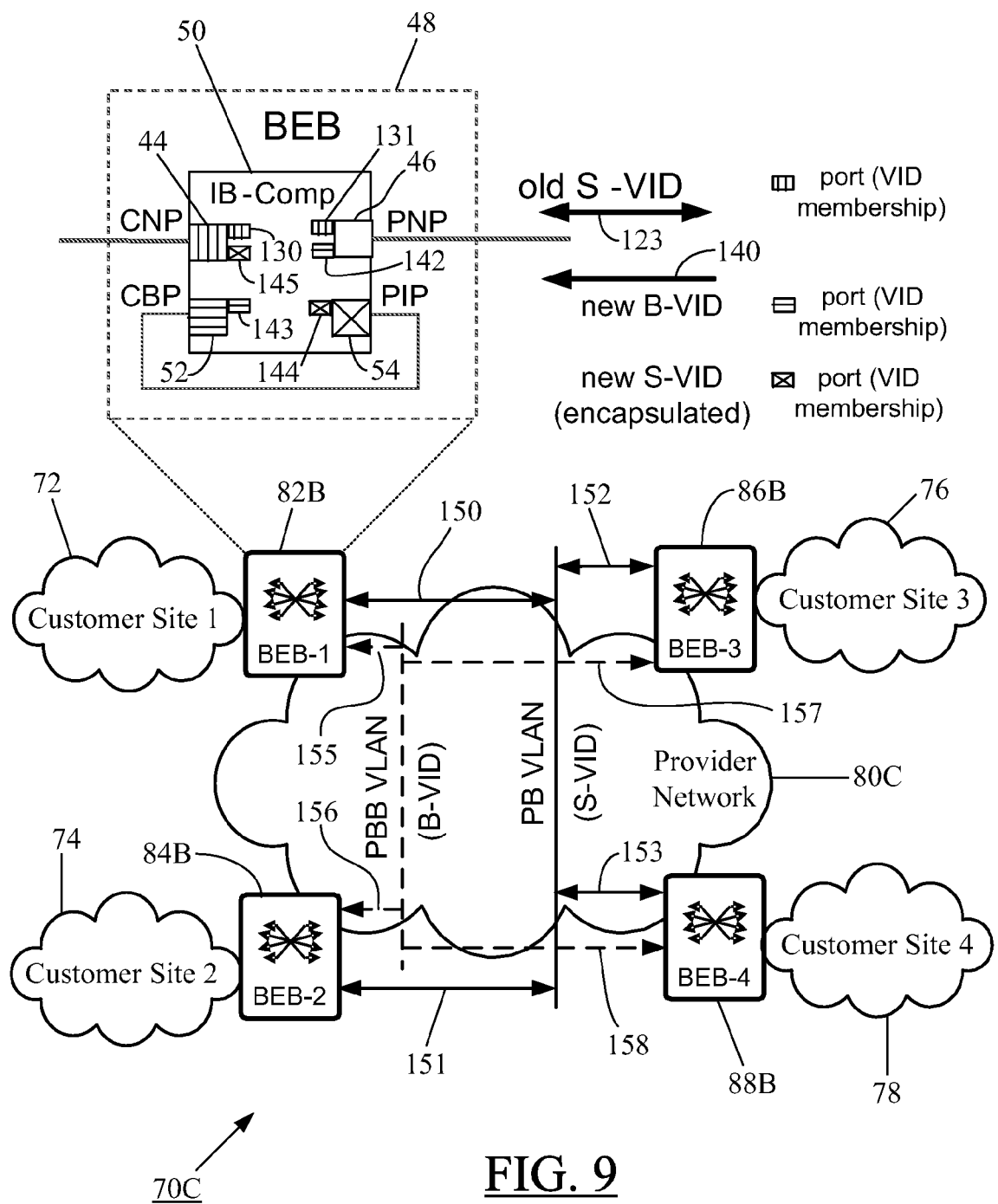
Figure 10:
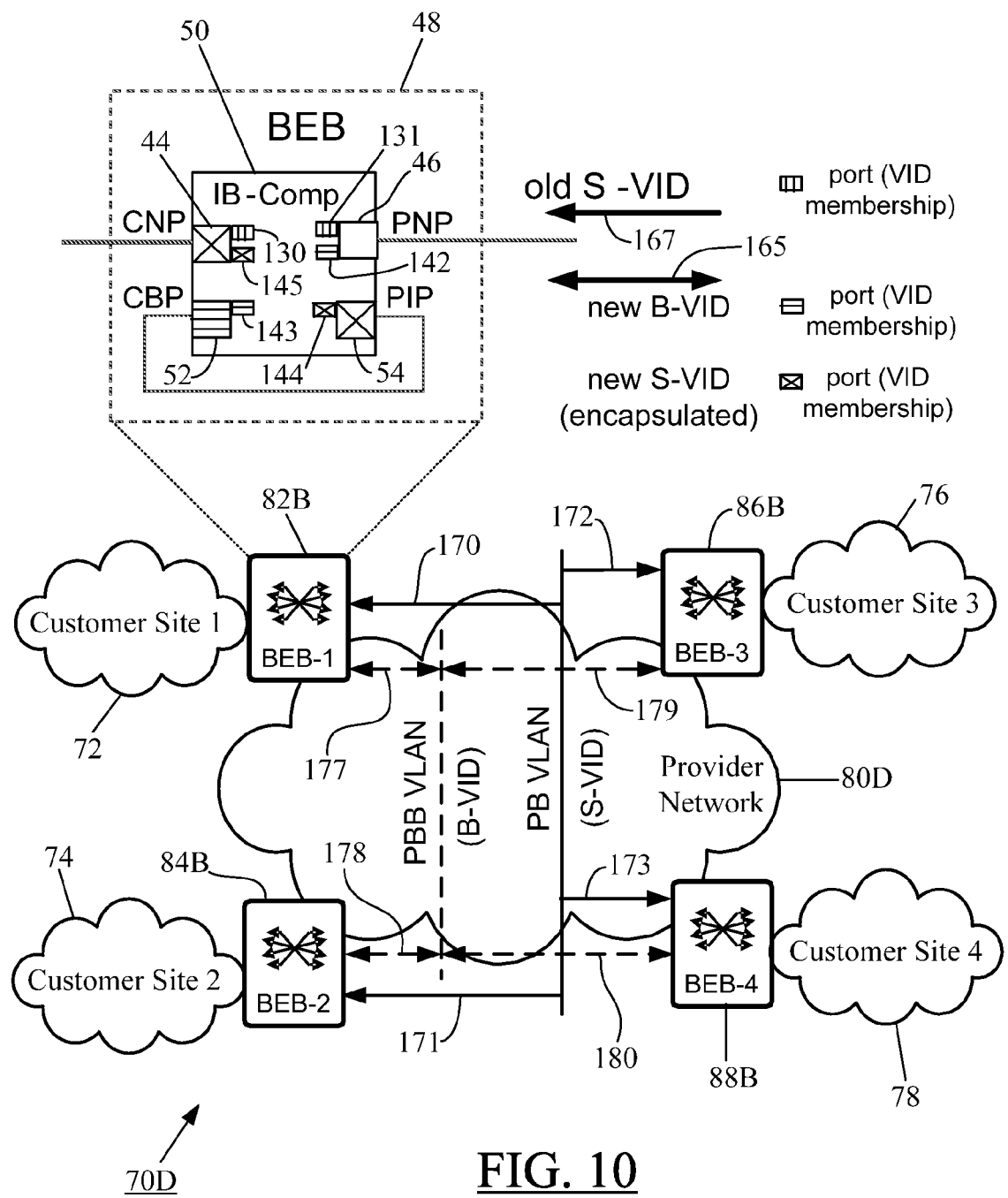

Thus, either through upgrade (block 102) or deployment of new edge bridges (blocks 104-105), each PEB 82A, 84A, 86A, 88A in the PB-based VLAN 80A in FIG. 7 becomes a BEB 82B, 84B, 86B, 88B as shown in the FIGS. 8 through 10.

Thereafter, at block 106 in FIG. 6 and as shown in the network configuration 70C in FIG. 9, the network controller 90 may configure a new S-VID and a new B-VID for the PBB VLAN service under migration in the provider network 80C (which supports both PB-based and PBB-based VLANs as shown in FIG. 9). The new S-VID is for the (PBB VLAN) service in the customer space and the new B-VID is for bridging in the provider backbone space (i.e., in the provider network 80C) by setting up the transport VID in each edge bridge (82B, 84B, 86B, 88B) for the support of the VLAN service under migration. At block 107, the network controller 90 may also configure an I-SID (Backbone Service Instance Identifier) assigned to the new service S-VID and transported on top of the new B-VID for the PBB VLAN service in each edge bridge 82B, 84B, 86B, 88B. At this stage, the new B-VID may not be used yet and all customer traffic may be still transmitted on the old PB VLAN (using old S-VID). In other words, the network controller 90 may configure the BEBs 82B, 84B, 86B, 88B such that the (PB-based) old VID is used if a frame is sent into the provider network 80C, but the BEBs may receive frames from the network 80C either on the (PB-based) old S-VID or on the (PBB-based) new B-VID. The old VID-based bi-directional communication is illustrated by bi-the directional arrow 123, and the new B-VID based one-way frame transfer is illustrated by the uni-directional arrow 140. The customer frame received from the network 80C on the new B-VID may be encapsulated with new S-VID, which encapsulation may be removed by the relevant ports in the IB-Component 50 prior to delivery of the frame to the customer site via CNP 44. The CNPs 44 can forward the frames received on either the old S-VID or the new B-VID to the corresponding customer site because CNPs are configured to be in the member set and untagged set of both the old S-VID and the new S-VID as illustrated in FIG. 9.

In FIG. 9, the ports 44 and 46 of the BEB 48 (i.e., each of the BEBs 82B, 84B, 86B, and 88B) are in the member set of the PB-based old S-VID as shown by rectangles 130, 131 with vertical linings; ports 46 and 52 of the BEB 48 are in the member set of the PBB-based new B-VID (for bridging in the provider backbone space) as shown by rectangles 142, 143 with horizontal linings; and ports 54 and 44 are in the member set of the PBB-based new S-VID as shown by rectangles 144, 145 with an "X" inside.

In FIG. 9, each BEB's bi-directional communication with the network fabric (using PB VLAN's old S-VID) is illustrated by solid bi-directional arrows 150-153, whereas each BEB's uni-directional frame receipt from the network fabric (on PBB VLAN's new B-VID) is illustrated by broken uni-directional arrows 155-158.

Figure 11:
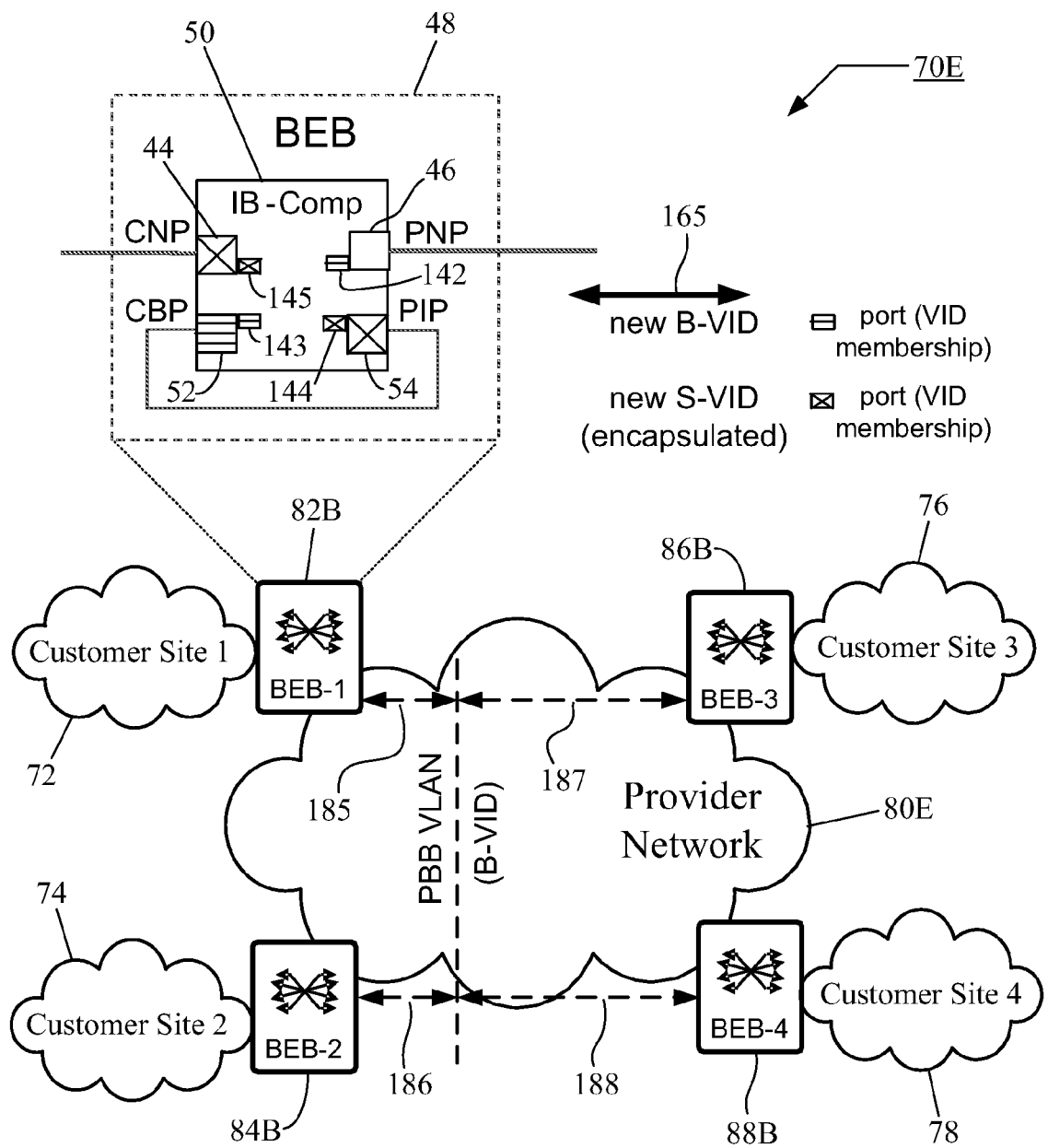

Thus, in FIG. 9, the outgoing customer traffic still exclusively uses (PB-based) old S-VID, but the incoming customer traffic is now supported on both old S-VID and (PBB-based) new S-VID at each edge node 82B, 84B, 86B, and 88B in the provider network 80C. The new S-VID and B-VID belong to the provider space. The new S-VID may be desirable to distinguish between S-VIDs that are going through and that are not going through PBB encapsulation. In the embodiments of FIGS. 9-11, the old S-VID does not go through PBB encapsulation, whereas the new S-VID does.

As indicated at block 108 in FIG. 6 and as shown in the network configuration 70D in FIG. 10, the network controller 90 may also move frame transmission (as opposed to just the frame reception in FIG. 9) from PB to PBB in a BEB by BEB basis. That is, the network controller 90 may configure all BEBs 82B, 84B, 86B, 88B one by one to use the upgraded (i.e., PBB-based) features when sending frames into the provider network 80D or receiving frames from the network 80D (which supports both PB- and PBB-based VLANs as shown in FIG. 10). Such configuration may be achieved by means of replacing the PVID (Port VLAN Identifier) of CNPs 44 from the (PB-based) old S-VID to the (PBB-based) new S-VID. Thus, customer traffic is redirected to the new B-VID in both directions (transmission and reception) as illustrated by the bi-directional arrow 165 in FIG. 10. However, although each BEBs 82B, 84B, 86B, 88B now uses PBB to send/receive frames tagged with the new B-VID, each BEB is still able to receive frames tagged with the old S-VID and forward customer data to customer sites as indicated by the uni-directional arrow 167 in FIG. 10.

In FIG. 10, the ports 44 and 46 of the BEB 48 (i.e., each of the BEBs 82B, 84B, 86B, and 88B) are in the member set of the PB-based old S-VID as shown by rectangles 130, 131 with vertical linings; ports 46 and 52 of the BEB 48 are in the member set of the PBB-based new B-VID (for bridging in the provider backbone space) as shown by rectangles 142, 143 with horizontal linings; and ports 54 and 44 are in the member set of the PBB-based new S-VID as shown by rectangles 144, 145 with an "X" inside. It is observed here that although the CNP 44 may support instances of old S-VID (as indicated by rectangle 130), the CNP 44 is now configured to primarily support the new S-VID as indicated by an "X" (instead of vertical lines as in FIGS. 7-9) in the square identifying the CNP 44. Thus, although the CNP in FIG. 10 is configured to support new PBB-based functionality (as part of migration from the previous implementations in FIGS. 7-9), the same reference numeral "44" is used in FIGS. 7-11 for the sake of consistency to refer to the CNP regardless of its configuration.

In FIG. 10, each BEB's uni-directional frame receipt from the network fabric (on PB VLAN's old S-VID) is illustrated by solid uni-directional arrows 170-173, whereas each BEB's bi-directional communication with the network fabric (using PBB VLAN's new B-VID) is illustrated by broken bi-directional arrows 177-180.

Thus, in FIG. 10, the outgoing customer traffic now exclusively uses (PBB-based) new B-VID, but the incoming customer traffic remains supported on both (PB-based) old S-VID and (PBB-based) new S-VID at each edge node 82B, 84B, 86B, and 88B in the provider network 80D.

To complete the migration of PB VLAN to PBB VLAN, the network controller 90 may now remove all configurations related to (PB-based) old S-VID from each upgraded/new edge node 82B, 84B, 86B, and 88B as indicated at block 109 in FIG. 6. The migration process is completed when the entire VLAN service is provided using the upgraded (i.e., PBB-based) features of the edge nodes as indicated at block 110 in FIG. 6. Thus, as illustrated in the network configuration 70E in FIG. 11, all incoming and outgoing customer frames at each edge node 82B, 84B, 86B, 88B now only use (PBB-based) new B-VID/S-VID as indicated by the bi-directional arrow 165. In FIG. 11, ports 46 and 52 of the BEB 48 (i.e., each of the BEBs 82B, 84B, 86B, and 88B) are in the member set of the PBB-based new B-VID (for bridging in the provider backbone space) and are shown by rectangles 142, 143 with horizontal linings; and ports 54 and 44 are in the member set of the PBB-based new S-VID as shown by rectangles 144, 145 with an "X" inside. The PNP 46 now supports communication on the new B-VID only.

In FIG. 11, each BEB's bi-directional communication with the network fabric (using PBB VLAN's new B-VID) is illustrated by broken bi-directional arrows 185-188. Thus, in FIG. 11, the outgoing and incoming customer traffic now exclusively uses (PBB-based) new B-VID in the provider network 80E. The PB VLAN service in the provider network 80E is thus fully migrated to the PBB VLAN service.

Figure 12:
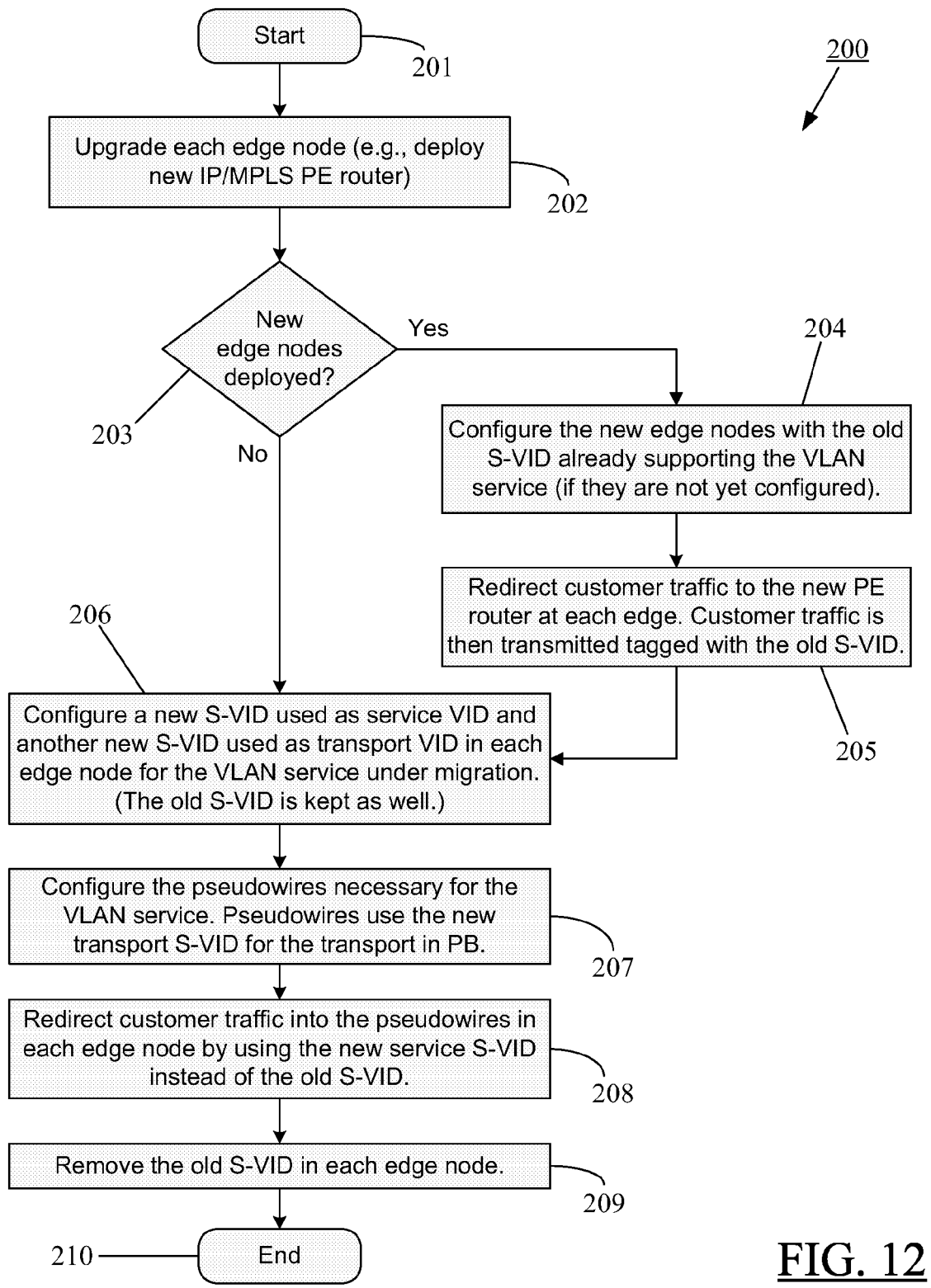
FIG. 12 shows an exemplary flowchart depicting steps to implement customer traffic migration from a PB VLAN to an IP/MPLS VLAN according to one embodiment of the present invention.

FIG. 12 shows an exemplary flowchart 200 depicting steps to implement customer traffic migration from a PB VLAN to an IP/MPLS VLAN according to one embodiment of the present invention. Because of similarities between the process illustrated in FIG. 12 and that discussed hereinbefore with reference to FIG. 6 (for migration of PB VLAN to PBB VLAN), only the salient features of the process in FIG. 12 will be discussed herein for the sake of brevity. It is noted here that the discussion of FIG. 12 is provided in the context of the general system configuration in FIG. 4 (which is applicable whether PB MEN is upgraded to PBB MEN or IP/MPLS MEN).

In FIG. 12, the IP/MPLS migration process starts at block 201. If IP/MPLS is introduced in the PB MEN, then the first step (block 202) may be to perform the upgrade on the edge nodes, which may mean the deployment of new IP/MPLS PE routers in the manner discussed hereinbefore with reference to FIG. 3. If new edge routers are deployed (block 203, FIG. 12), then the next step for the network controller 90 is to establish the old PB connectivity on the new edge nodes. That is, the old S-VID already used in PEBs and the PB network to support the (PB-based) VLAN service under migration is configured on the new (IP/MPLS) edge nodes too (block 204). Next, at block 205, the network controller 90 may redirect customer traffic from the old PEBs to the new IP/MPLS PE routers on an edge node by edge node basis. The customer traffic is then transmitted tagged with the (PB-based) old S-VID. Thus, the new nodes (IP/MPLS) support the (PB-based) VLAN with the old S-VID. It is observed here that the steps 204, 205 may depend on the exact way of (PB) edge node upgrade, which may be implementation-dependent. Therefore, these steps may slightly wary depending on exact implementation of the upgrading procedure (e.g., not a new IP/MPLS node but only a new line card deployed in the PEB, etc.) as can be appreciated by one skilled in the art.

Next, the network controller 90 may configure a new S-VID as service VID and another new S-VID as a transport VID in each edge node on a node by node basis for the VLAN service under migration (block 206, FIG. 12). The PB-based old S-VID is still kept as well. At block 207, the network controller 90 may set up the VPLS pseudowires that may be necessary for the support of the IP/MPLS VLAN, such that the new transport S-VID is used for the transport of pseudowires in the PB network. The VPLS port of the IP/MPLS PE routers may be in the member set of the new service S-VID. Thus, this new service S-VID may be assigned to VPLS in support of the VLAN service under migration. If all these configurations are performed, then VPLS is established for the support of the VLAN service under migration. Thus, the network controller 90 may establish two connectivity structures in each edge node—i.e., the old PB-based connectivity structure and the new IP/MPLS based connectivity structure—for the support of the VLAN under migration, but all traffic may be still tagged with the (PB-based) old S-VID. That is, the network controller 90 may configure IP/MPLS edge nodes such that the old S-VID is used if a frame is sent into the provider network. However, frames may be received either on the old S-VID or from VPLS on the new service S-VID, and may be forwarded to the customer site by the respective edge nodes because CNPs (in the edge nodes) are configured to be in the member set and untagged set of both the old S-VID and the new service S-VID.

At block 208, the network controller 90 may then redirect customer traffic into the VPLS pseudowires in each edge node on a node by node basis—i.e., the customer traffic is redirected from the old (PB-based) technology to the new (IP/MPLS) one. That is, the network controller 90 may configure all edge nodes one by one to use VPLS when sending frames into the provider network by changing the PVID (Port VLAN ID) of CNPs from the old S-VID to the new service S-VID. Edge nodes are still able to receive frames tagged with the old S-VID and forward the customer data to customer sites. The VLAN service migration is completed at block 209 when the entire VLAN service is provided by VPLS nodes. Hence, the network controller 90 may remove all configurations related to the old S-VID from edge nodes because no traffic uses the old S-VID any more. The migration process ends at block 210.

Figure 13:
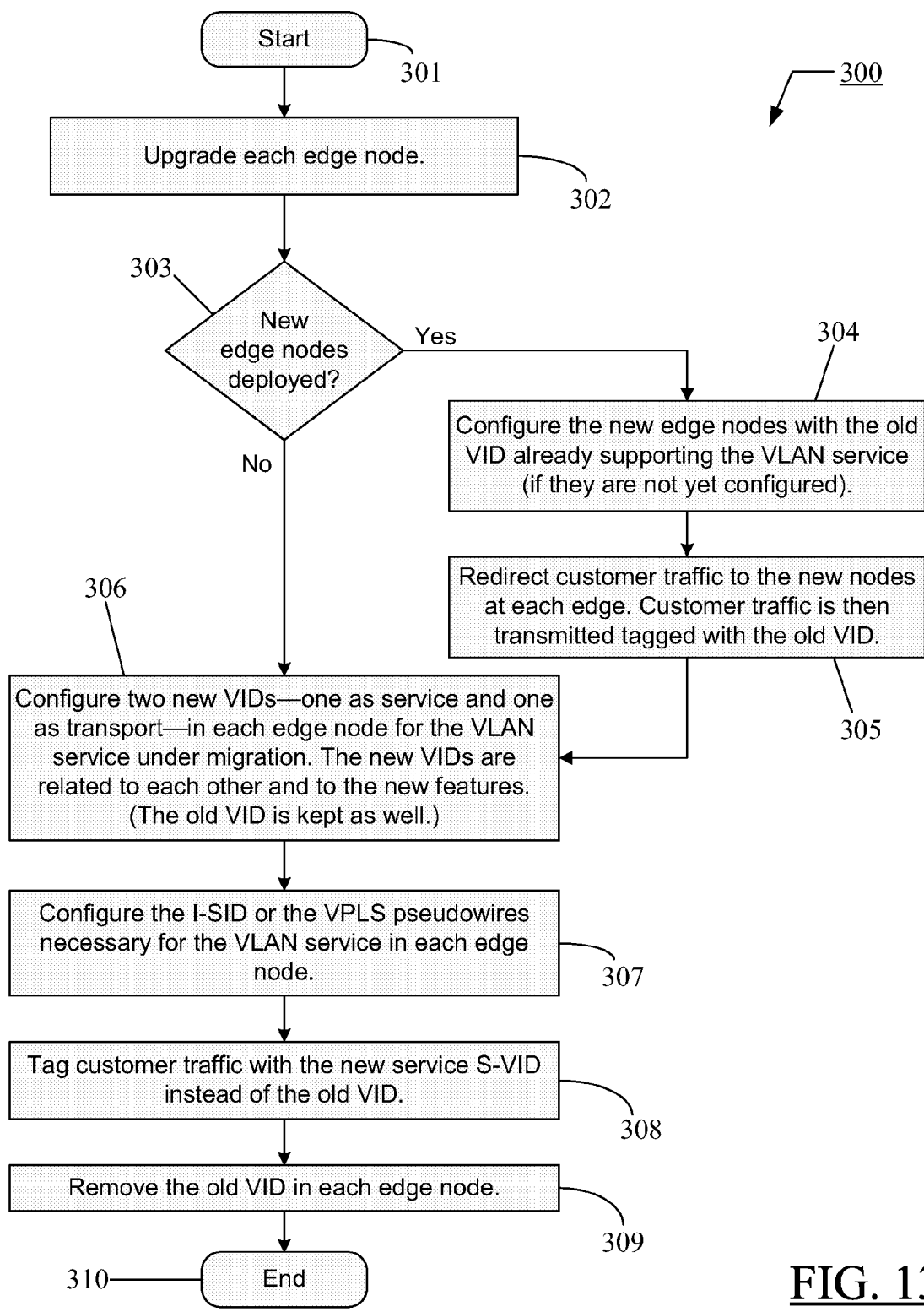
FIG. 13 shows an exemplary general flowchart combining steps depicted in FIGS. 6 and 12 to implement customer traffic migration from a PB VLAN to either a PBB VLAN or an IP/MPLS VLAN according to one embodiment of the present invention.

FIG. 13 shows an exemplary general flowchart 300 combining steps depicted in FIGS. 6 and 12 to implement customer traffic migration from a PB VLAN to either a PBB VLAN or an IP/MPLS VLAN according to one embodiment of the present invention. The steps 302 through 309 are generalized versions of the more specific steps 102 through 109 in FIGS. 6 and 202 through 209 in FIG. 12. The steps 301-310 in FIG. 13 are shown for the sake of completeness of the VLAN service migration discussion presented herein and are self-explanatory. Hence, additional discussion of FIG. 13 is not provided herein for the sake of brevity.

It is noted here that although features and elements are described above in particular combinations, each feature or element can be used alone without the other features and elements or in various combinations with or without other features and elements as per desired implementation.

The foregoing describes a system and method for in-service migration for a VLAN service if a PB MEN is upgraded to PBB MEN or IP/MPLS MEN. After the deployment of the new technology (PBB or IP/MPLS), a sequence of management actions are performed in order to configure PBB or IP/MPLS edge nodes to use the new technology to support the VLAN service while also still using the old technology (PB-based) to support the VLAN service. Both connectivity structures (i.e., connectivity structures for the old as well as the new technologies) are maintained in the edge nodes during the entire migration process. Customer traffic is then smoothly redirected to the new technology individually on each edge node—on an edge node by edge node basis. As soon as each edge node entirely provides the VLAN service under the new technology, the migration is complete. Thus, the invention minimizes traffic outage in the upgraded VLAN service by avoiding timing problems when switching traffic from the old technology to the new technology. Furthermore, the migration sequence described in embodiments of the present invention enables providers to check the outcome of individual configuration steps before implementing the next configuration step. This decreases the outage caused by an accidental erroneous configuration and supports easy roll back capability. It is observed here that the VLAN service migration methodology described herein in the context of PBB or IP/MPLS technologies may be suitably adapted to upgrades of other Ethernet technologies as well (such as, for example, an MPLS-TP (MPLS Transport Profile) based transport network service).

The present invention may of course, be carried out in other specific ways than those herein set forth without departing from the essential characteristics of the invention. The present embodiments are, therefore, to be considered in all respects as illustrative and not restrictive and all changes coming within the meaning and equivalency range of the appended claims are intended to be embraced therein.

The invention claimed is:

1. A method of upgrading a Provider Bridge (PB)-based Virtual Local Area Network (VLAN) providing a VLAN service under a first technology into an upgraded VLAN providing the VLAN service under a second technology, the method comprising:

performing in-service upgrading of each Provider Edge Bridge (PEB) supporting the VLAN service under the first technology in the PB-based VLAN into a corresponding upgraded edge node supporting the VLAN service under the second technology in the upgraded VLAN;

using a processor, configuring each upgraded edge node to simultaneously support the VLAN service under both of the first and the second technologies until all customer traffic is migrated to the second technology;

using the processor, providing sequential in-service migration of the customer traffic to the second technology on an edge node by edge node basis;

wherein the first technology is PB-related;

wherein the second technology is Provider Backbone Bridge (PBB) related;

wherein performing in-service upgrading of each PEB comprises upgrading a first Provider Network Port (PNP) of each PEB to implement functionalities of a Backbone Edge Bridge (BEB) in the PBB while maintaining a second PNP of each PEB to implement PB functionalities.

2. The method of claim 1, wherein configuring each upgraded edge node comprises maintaining connectivity structures related to the first technology and the second technology in each upgraded edge node until all customer traffic is migrated to the second technology.

3. A method of upgrading a Provider Bridge (PB)-based Virtual Local Area Network (VLAN) providing a VLAN service under a first technology into an upgraded VLAN providing the VLAN service under a second technology, the method comprising:
   performing in-service upgrading of each Provider Edge Bridge (PEB) supporting the VLAN service under the first technology in the PB-based VLAN into a corresponding upgraded edge node supporting the VLAN service under the second technology in the upgraded VLAN;
   using a processor, configuring each upgraded edge node to simultaneously support the VLAN service under both of the first and the second technologies until all customer traffic is migrated to the second technology;
   using the processor, providing sequential in-service migration of the customer traffic to the second technology on an edge node by edge node basis;
   wherein the first technology is PB-related;
   wherein the second technology is Provider Backbone Bridge (PBB) related;
   wherein performing in-service upgrading of each PEB comprises upgrading each PEB to implement functionalities of a Backbone Edge Bridge (BEB) in the PBB without adding a new Provider Network Port (PNP) to implement the functionalities of the BEB.

4. A method of upgrading a Provider Bridge (PB)-based Virtual Local Area Network (VLAN) providing a VLAN service under a first technology into an upgraded VLAN providing the VLAN service under a second technology, the method comprising:
   performing in-service upgrading of each Provider Edge Bridge (PEB) supporting the VLAN service under the first technology in the PB-based VLAN into a corresponding upgraded edge node supporting the VLAN service under the second technology in the upgraded VLAN, wherein at least one of the upgraded edge nodes is a new edge node deployed to implement the VLAN service under the second technology;
   using a processor, configuring each upgraded edge node to simultaneously support the VLAN service under both of the first and the second technologies until all customer traffic is migrated to the second technology, wherein configuring each upgraded edge node includes:
      configuring each new edge node with an old Service VLAN Identifier (S-VID) supporting the VLAN service under the first technology;
      redirecting customer traffic to each new edge node; and
      configuring each new edge node to transmit the customer traffic tagged with the old S-VID;
   using the processor, providing sequential in-service migration of the customer traffic to the second technology on an edge node by edge node basis.

5. A method of upgrading a Provider Bridge (PB)-based Virtual Local Area Network (VLAN) providing a VLAN service under a first technology into an upgraded VLAN providing the VLAN service under a second technology, the method comprising:
   performing in-service upgrading of each Provider Edge Bridge (PEB) supporting the VLAN service under the first technology in the PB-based VLAN into a corresponding upgraded edge node supporting the VLAN service under the second technology in the upgraded VLAN;
   using a processor, configuring each upgraded edge node to simultaneously support the VLAN service under both of the first and the second technologies until all customer traffic is migrated to the second technology, wherein configuring each upgraded edge node includes:
      configuring a new Service VLAN Identifier (S-VID) and a new transport VID in each upgraded edge node for the VLAN service under the second technology;
      maintaining an old S-VID in each upgraded edge node to support the VLAN service under the first technology;
      configuring each upgraded edge node to use only the old S-VID when sending the customer traffic into a provider network, wherein the provider network supports both the PB-based VLAN and the upgraded VLAN; and
      configuring each upgraded edge node to receive the customer traffic from the provider network on either the old S-VID or the new transport VID, and to forward received customer traffic to a respective customer site;
   using the processor, providing sequential in-service migration of the customer traffic to the second technology on an edge node by edge node basis.

6. The method of claim 5, wherein configuring each upgraded edge node further includes configuring a service parameter in each upgraded edge node in conjunction with the new S-VID and the new transport VID to support the customer traffic in the upgraded VLAN.

7. The method of claim 6, wherein one of the following applies:
   the new S-VID is a first S-VID, the new transport VID is a Backbone VID (B-VID) and the service parameter is a Backbone Service Instance Identifier (I-SID) assigned to the first S-VID and transported on top of the B-VID when the upgraded edge node implements functionalities of a Backbone Edge Bridge (BEB); and
   the new S-VID is a second S-VID, the new transport VID is a third S-VID, and the service parameter is a plurality of Virtual Private LAN Service (VPLS) pseudowires that are transported in the PB-based VLAN using the third S-VID when the upgraded edge node implements Internet Protocol/Multi Protocol Label Switching (IP/MPLS) functionality.

8. The method of claim 6, wherein providing sequential in-service migration of the customer traffic comprises:
   sequentially configuring each upgraded edge node on an edge node by edge node basis to use only the new transport VID when sending the customer traffic into the provider network; and
   configuring each upgraded node to continue to receive the customer traffic from the provider network on either the old S-VID or the new transport VID, and to forward received customer traffic to the respective customer site.

9. The method of claim 8, wherein providing sequential in-service migration of the customer traffic further comprises:
   sequentially configuring each upgraded edge node on the edge node by edge node basis to use only the new transport VID when sending the customer traffic into the provider network and to receive the customer traffic from the provider network only on the new transport VID, thereby concluding upgrading of the PB-based VLAN into the upgraded VLAN by completely migrating the VLAN service from the first technology to the second technology.

10. A network controller in communication with a plurality of edge nodes supporting a Virtual Local Area Network (VLAN) service under a first technology, wherein each of the plurality of edge nodes is upgraded into a corresponding upgraded edge node supporting the VLAN service under a second technology, the network controller comprising:
   a processor; and
   a non-transitory memory containing a program code, which, when executed by the processor, causes the processor to:
      configure each upgraded edge node to simultaneously support the VLAN service under both of the first and the second technologies until all customer traffic is migrated to the second technology, wherein at least one of the upgraded edge nodes is a new edge node deployed to implement the VLAN service under the second technology;
      configure each new edge node with an old Service VLAN Identifier (S-VID) supporting the VLAN service under the first technology;
      redirect customer traffic to each new edge node; and
      configure each new edge node to transmit the customer traffic tagged with the old S-VID;
      provide sequential in-service migration of the customer traffic to the second technology on an edge node by edge node basis.

11. The network controller of claim 10, wherein the program code, upon execution by the processor, further causes the processor to maintain connectivity structures related to the first technology and the second technology in each upgraded edge node until all customer traffic is migrated to the second technology.

12. A network controller in communication with a plurality of edge nodes supporting a Virtual Local Area Network (VLAN) service under a first technology, wherein each of the plurality of edge nodes is upgraded into a corresponding upgraded edge node supporting the VLAN service under a second technology, the network controller comprising:
   a processor; and
   a non-transitory memory containing a program code, which, when executed by the processor, causes the processor to:
      configure each upgraded edge node to simultaneously support the VLAN service under both of the first and the second technologies until all customer traffic is migrated to the second technology;
      configure a new Service VLAN Identifier (S-VID) and a new transport VID in each upgraded edge node for the VLAN service under the second technology;
      maintain an old S-VID in each upgraded edge node to support the VLAN service under the first technology;
      configure each upgraded edge node to use only the old S-VID when sending the customer traffic into a provider network, wherein the provider network supports the VLAN service under both of the first and the second technologies;
      configure each upgraded edge node to receive the customer traffic from the provider network on either the old S-VID or the new transport VID, and to forward received customer traffic to a respective customer site; and
      configure a service parameter in each upgraded edge node in conjunction with the new S-VID and the new transport VID to support the customer traffic under the second technology;
      provide sequential in-service migration of the customer traffic to the second technology on an edge node by edge node basis.

13. The network controller of claim 12, wherein the program code, upon execution by the processor, causes the processor to:
   sequentially configure each upgraded edge node on the edge node by edge node basis to use only the new transport VID when sending the customer traffic into the provider network; and
   configure each upgraded node to continue to receive the customer traffic from the provider network on either the old S-VID or the new transport VID, and to forward received customer traffic to the respective customer site.

14. The network controller of claim 13, wherein the program code, upon execution by the processor, causes the processor to:
   sequentially configure each upgraded edge node on the edge node by edge node basis to use only the new transport VID when sending the customer traffic into the provider network and to receive the customer traffic from the provider network only on the new transport VID, thereby concluding the sequential in-service migration of the customer traffic to the second technology.

15. The method of claim 3, wherein configuring each upgraded edge node comprises maintaining connectivity structures related to the first technology and the second technology in each upgraded edge node until all customer traffic is migrated to the second technology.

16. The method of claim 4, wherein configuring each upgraded edge node comprises maintaining connectivity structures related to the first technology and the second technology in each upgraded edge node until all customer traffic is migrated to the second technology.

17. The method of claim 5, wherein configuring each upgraded edge node comprises maintaining connectivity structures related to the first technology and the second technology in each upgraded edge node until all customer traffic is migrated to the second technology.

18. The network controller of claim 12, wherein the program code, upon execution by the processor, further causes the processor to maintain connectivity structures related to the first technology and the second technology in each upgraded edge node until all customer traffic is migrated to the second technology.

* * * * *